United States Patent
Fang et al.

(10) Patent No.: US 11,806,796 B2
(45) Date of Patent: Nov. 7, 2023

(54) CUTTING INSERT AND CUTTING TOOL COMPRISING CUTTING INSERT

(71) Applicant: KENNAMETAL INC., Latrobe, PA (US)

(72) Inventors: Xiangdong D. Fang, Latrobe, PA (US); Qiang Wu, Latrobe, PA (US); Jean-luc Dufour, Latrobe, PA (US); Andreas Wuerfels, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 17/202,057

(22) Filed: Mar. 15, 2021

(65) Prior Publication Data

US 2022/0288705 A1  Sep. 15, 2022

(51) Int. Cl.
*B23C 5/20* (2006.01)
*B23C 5/22* (2006.01)

(52) U.S. Cl.
CPC ............ *B23C 5/202* (2013.01); *B23C 5/2213* (2013.01); *B23C 5/20* (2013.01); *B23C 2200/206* (2013.01); *B23C 2210/088* (2013.01)

(58) Field of Classification Search
CPC ........ B23C 2200/086; B23C 2200/125; B23C 2250/16; B23C 5/202; B23C 2200/045; B23C 2200/206; B23C 5/2213; B23C 5/20; B23C 5/06; B23C 2200/0416; B23C 2200/0407; B23C 2210/045; B23B 2210/088

See application file for complete search history.

(56) References Cited

U.S. PATENT DOCUMENTS 3,268,977 A  *  8/1966  Diemond .............. B23B 27/167
                                                     407/103
3,574,911 A  *  4/1971  Penoyar ................. B23C 5/202
                                                     407/42

(Continued)

FOREIGN PATENT DOCUMENTS

CN     106825719 A    6/2017
DE     69602258 T2    11/1999

(Continued)

OTHER PUBLICATIONS

Iscar Product RCMT1206-PW-T20 IC928.
Oct. 5, 2022 Foreign Office Action German Application No. 102022106006.3, 12 pages.

*Primary Examiner* — Sara Addisu
(74) *Attorney, Agent, or Firm* — Christopher J. Owens

(57) ABSTRACT

A cutting tool includes a toolholder and a cutting insert. The toolholder includes a toolholder pocket having a pocket wall including a first anti-rotation engagement surface and a second anti-rotation engagement surface. The cutting insert is mounted in the toolholder pocket. The cutting insert includes: an upper surface, the upper surface having a plurality circular sinusoidal cutting edges; a lower surface opposite the upper surface; and an exterior sidewall between the upper surface and the lower surface. The first anti-rotation engagement surface and the second anti-rotation engagement surface of the pocket wall of the toolholder engage the exterior sidewall of the cutting insert to resist rotation of cutting insert.

17 Claims, 12 Drawing Sheets

(56) References Cited

U.S. PATENT DOCUMENTS

| | | | |
|---|---|---|---|
| 3,636,602 A * | 1/1972 | Owen | B23C 5/202 |
| | | | 407/113 |
| 3,875,631 A | 4/1975 | Malinchak | |
| 3,922,766 A | 12/1975 | Malinchak | |
| 4,248,553 A * | 2/1981 | Kraemer | B23C 5/202 |
| | | | 407/114 |
| 5,221,164 A | 6/1993 | Alaire | |
| 5,562,370 A * | 10/1996 | Vogel | B23C 5/2213 |
| | | | 407/42 |
| 5,586,844 A * | 12/1996 | Nyman | B23B 27/1677 |
| | | | 407/108 |
| 6,004,081 A * | 12/1999 | Hellstrom | B23C 5/2213 |
| | | | 407/103 |
| 6,050,751 A * | 4/2000 | Hellstrom | B23B 27/1622 |
| | | | 407/103 |
| 6,238,133 B1 | 5/2001 | DeRoche et al. | |
| 6,332,385 B1 * | 12/2001 | Kautto | B23B 27/06 |
| | | | 82/47 |
| 6,540,448 B2 * | 4/2003 | Johnson | B23C 5/006 |
| | | | 407/43 |
| 6,599,061 B1 | 7/2003 | Nelson | |
| 6,607,333 B2 * | 8/2003 | Satran | B23C 5/1036 |
| | | | 407/42 |
| 7,008,145 B2 | 3/2006 | Astrakhan | |
| 9,700,969 B2 | 7/2017 | Fang et al. | |
| 2003/0219320 A1 | 11/2003 | Horiike et al. | |
| 2004/0028486 A1 * | 2/2004 | Englund | B23B 27/164 |
| | | | 407/90 |
| 2005/0019110 A1 | 1/2005 | Astrakhan | |
| 2005/0232711 A1 * | 10/2005 | Shaheen | B23B 27/1644 |
| | | | 407/107 |
| 2005/0238444 A1 * | 10/2005 | Virtanen | B23B 27/04 |
| | | | 407/110 |
| 2006/0245837 A1 | 11/2006 | Dufour et al. | |
| 2010/0003089 A1 * | 1/2010 | Horiike | B23C 5/109 |
| | | | 407/42 |
| 2010/0047026 A1 * | 2/2010 | Horiike | B23C 5/202 |
| | | | 407/42 |
| 2011/0164932 A1 | 7/2011 | Choi et al. | |
| 2013/0039705 A1 | 2/2013 | Fang et al. | |
| 2013/0129432 A1 * | 5/2013 | Jaeger | B23C 5/2247 |
| | | | 407/42 |
| 2013/0129436 A1 | 5/2013 | Hoffer | |
| 2013/0223942 A1 * | 8/2013 | Matsuo | B23C 5/109 |
| | | | 407/42 |
| 2014/0072377 A1 * | 3/2014 | Sunnvius | B23C 5/202 |
| | | | 407/42 |
| 2014/0086696 A1 * | 3/2014 | Fang | B23C 5/2213 |
| | | | 407/103 |
| 2014/0219734 A1 | 8/2014 | Hoffer et al. | |
| 2016/0271707 A1 * | 9/2016 | Lee | B23C 5/202 |
| 2017/0189974 A1 * | 7/2017 | Otsuka | B23C 5/109 |
| 2018/0147642 A1 * | 5/2018 | Takahashi | B23C 5/2213 |
| 2021/0001417 A1 * | 1/2021 | Wuerfels | B23C 5/202 |
| 2021/0379679 A1 * | 12/2021 | Bonenfant | B23C 5/06 |
| 2022/0105578 A1 * | 4/2022 | Rue | B23C 5/2213 |

FOREIGN PATENT DOCUMENTS

| | | |
|---|---|---|
| DE | 602004009936 T2 | 8/2008 |
| DE | 102012022173 A1 | 5/2013 |
| EP | 3643439 A1 | 4/2020 |
| JP | 2006192567 A | 7/2006 |
| JP | 2007-210090 A | 8/2007 |
| JP | 2009-172761 A | 8/2009 |
| WO | 1998001249 A1 | 1/1998 |

\* cited by examiner

000# CUTTING INSERT AND CUTTING TOOL COMPRISING CUTTING INSERT

FIELD

The present description relates to cutting inserts and cutting tools comprising cutting inserts.

BACKGROUND

Cutting inserts used in cutting tools, such as milling cutters, are typically mounted in pockets spaced around a periphery of a tool body. New materials have increasingly hard and tough properties and thus create a challenge for cutting inserts.

Thus, there is a need for new cutting inserts new cutting systems comprising cutting inserts for improved performance when cutting difficult-to-cut materials.

SUMMARY

In one embodiment, a cutting insert includes: an upper surface, the upper surface having a plurality of circular sinusoidal cutting edges; a lower surface opposite the upper surface, the lower surface having a plurality of polygonal edges corresponding to the plurality of circular sinusoidal cutting edges; and an exterior sidewall between the upper surface and the lower surface.

In an aspect, the exterior sidewall provides a positive cutting clearance under the plurality of circular sinusoidal cutting edges.

In another aspect, the exterior sidewall has a plurality of convex flank surfaces between the plurality of circular sinusoidal cutting edges and the plurality of polygonal edges.

In yet another aspect, the plurality of circular sinusoidal cutting edges extend about the entire periphery of the upper surface.

In yet another aspect, the plurality of circular sinusoidal cutting edges extend about only a portion of the entire periphery of the upper surface.

In yet another aspect, the upper surface has the plurality of circular sinusoidal cutting edges and a plurality of circular edges.

In another embodiment, a cutting tool includes a toolholder including: a toolholder pocket having a pocket wall, the pocket wall comprising a first anti-rotation engagement surface and a second anti-rotation engagement surface; and a cutting insert mounted in the toolholder pocket. The cutting insert includes: an upper surface, the upper surface having a plurality circular sinusoidal cutting edges; a lower surface opposite the upper surface; and an exterior sidewall between the upper surface and the lower surface. The first anti-rotation engagement surface and the second anti-rotation engagement surface of the pocket wall of the toolholder engage the exterior sidewall of the cutting insert to resist rotation of cutting insert.

In an aspect, the lower surface of the cutting insert has a plurality of polygonal edges corresponding to the plurality of circular sinusoidal cutting edges.

In another aspect, the exterior sidewall has a plurality of convex flank surfaces under the plurality of circular sinusoidal cutting edges.

In yet another aspect, the exterior sidewall provides a positive cutting clearance under the plurality of circular sinusoidal cutting edges.

In yet another aspect, the plurality of circular sinusoidal cutting edges extend about the entire periphery of the upper surface.

In yet another aspect, the plurality of circular sinusoidal cutting edges extend about only a portion of the entire periphery of the upper surface.

In yet another aspect, the upper surface has the plurality of circular sinusoidal cutting edges and a plurality of circular edges.

In yet another aspect, the first anti-rotation engagement surface is in the form of a truncated convex anti-rotation engagement surface.

In yet another aspect, the first anti-rotation engagement surface is in the form of a concave anti-rotation engagement surface.

In yet another aspect, the second anti-rotation engagement surface is in the form of a vertical flat surface.

In yet another aspect, the second anti-rotation engagement surface is in the form of a truncated convex anti-rotation engagement surface.

In yet another aspect, the second anti-rotation engagement surface is in the form of a concave anti-rotation engagement surface.

In yet another embodiment, a method of cutting includes: mounting a cutting insert on a toolholder, the cutting insert having a circular sinusoidal cutting edge and an exterior sidewall beneath the circular sinusoidal cutting edge; and positioning an anti-rotation engagement surface in contact with the exterior sidewall of the cutting insert to resist rotation of cutting insert.

Other embodiments of the disclosed cutting insert cutting tool and will become apparent from the following detailed description, the accompanying drawings and the appended claims.

DETAILED DESCRIPTION

FIGS. 1 to 6 relate a cutting tool according to a first embodiment of the present description, in which the cutting tool includes a toolholder and a plurality of cutting inserts having a plurality of circular sinusoidal cutting inserts extending about a portion of an entire periphery thereof. FIGS. 7 to 11 relate a cutting tool according to a second embodiment of the present description, in which the cutting tool includes a toolholder and a plurality of cutting inserts having a plurality of circular sinusoidal cutting inserts extending about the entire periphery thereof.

Figure 1:
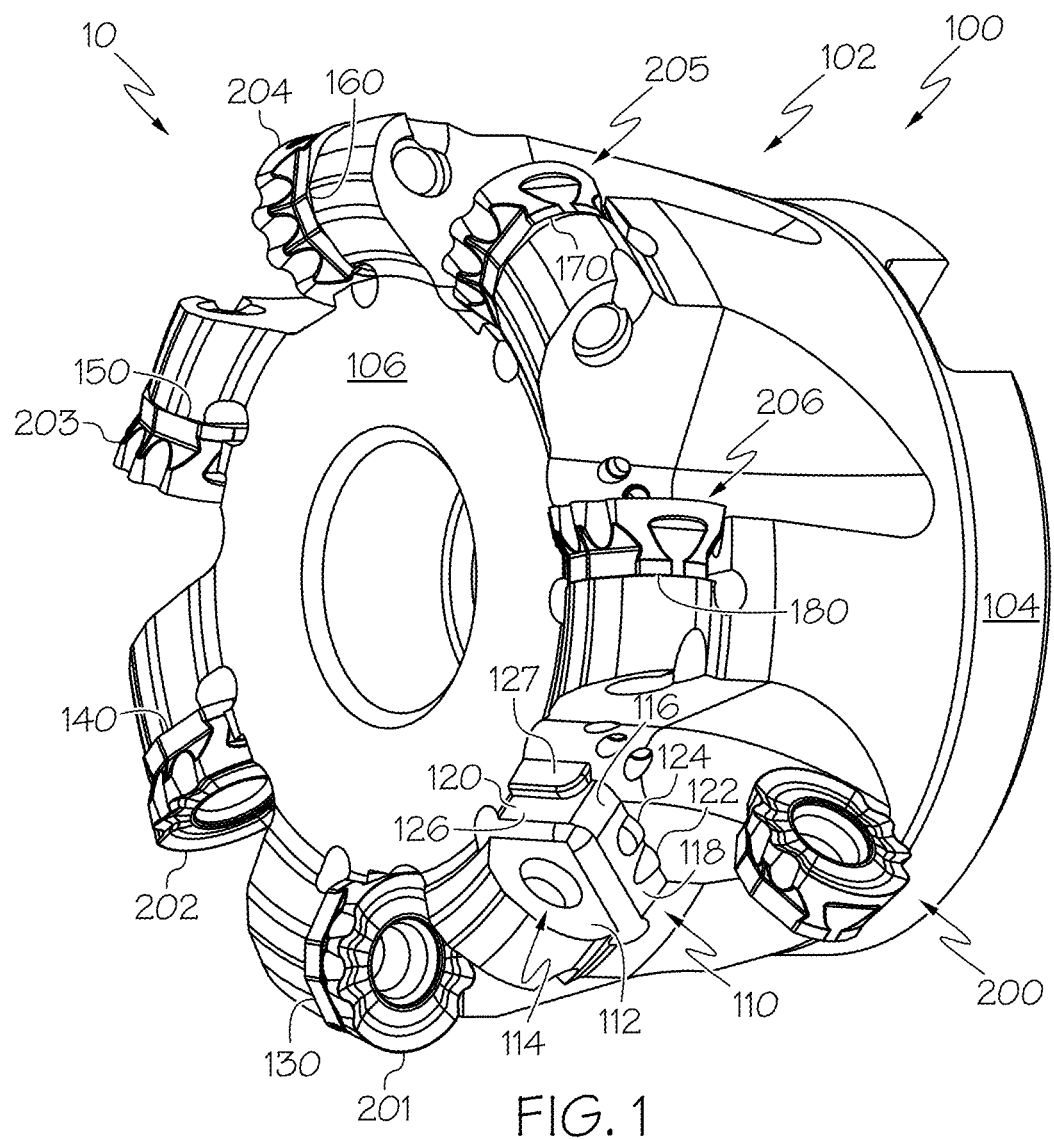
FIG. 1 is a perspective view of a cutting tool according to a first embodiment of the present description, in which the cutting tool includes a plurality of cutting inserts.
Figure 7:
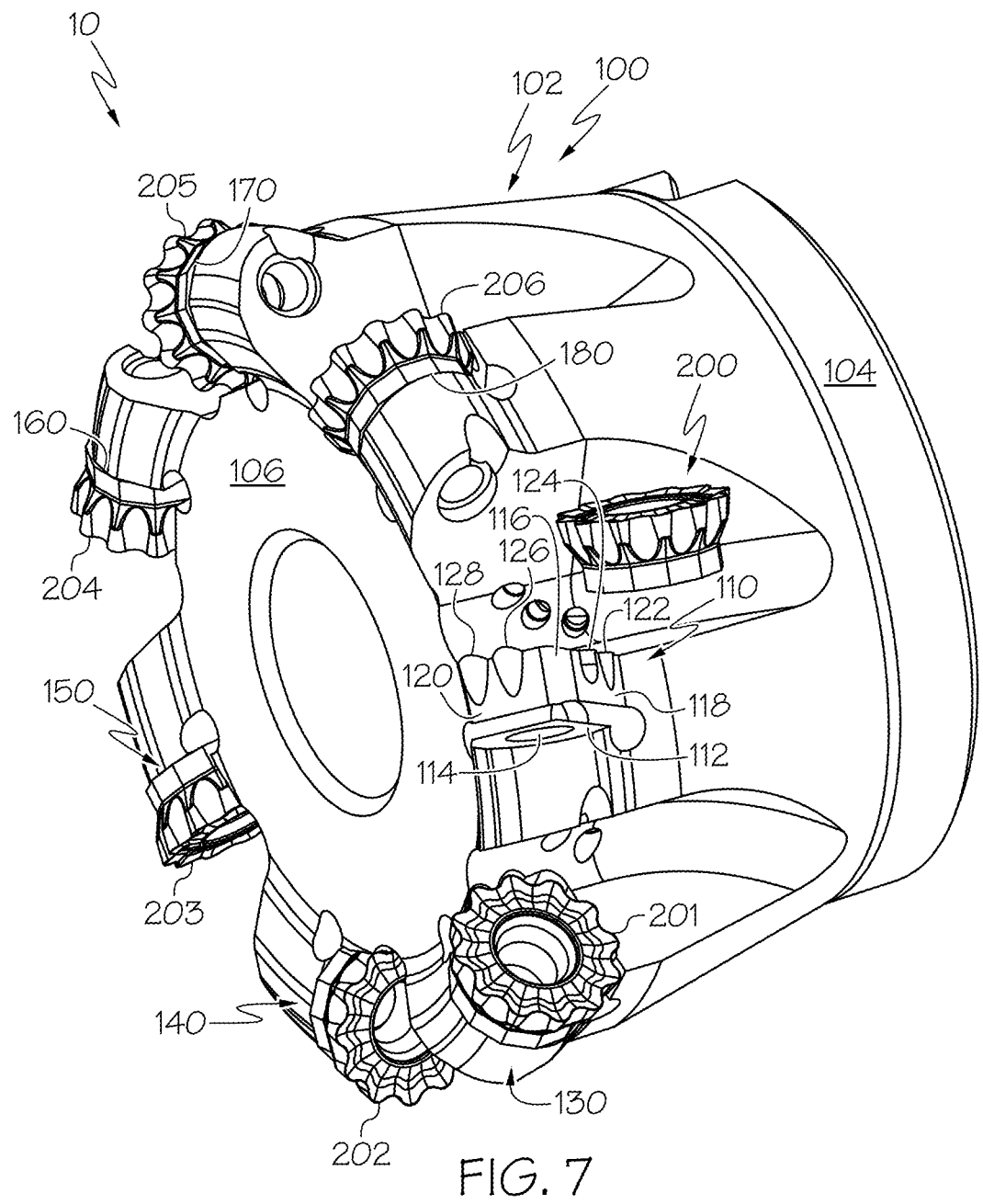
FIG. 7 is a perspective view of a cutting tool according to a second embodiment of the present description, in which the cutting tool includes a plurality of cutting inserts.

FIGS. 1 and 7 are perspective views of exemplary cutting tools 10 of the present description. The cutting tools 10 includes a toolholder 100 and a cutting insert 200. The cutting tool 10 may include one or more additional cutting inserts 201, 202, 203, 204, 205, 206, which may be identical to cutting insert 200.

Referring to FIGS. 1 and 7, toolholder 100 illustrated therein is exemplary. It will be understood that the toolholder 100 of the present description can include any type of toolholder 100 capable of holding a cutting insert 200 of the present description. The toolholder material and shape may be any material and shape not inconsistent with the objectives of the present description.

Referring to FIGS. 1 and 7, the toolholder 100 includes a toolholder body 102. The toolholder body 102 as illustrated has the form of a toolholder body for a milling cutter but may have the shape of a toolholder body for any other cutting tool capable of holding the cutting insert 200 of the present description. The toolholder body 102 may, for example, include a rear shank 104 and a front face 106.

Referring to FIGS. 1 and 7, the toolholder body 102 includes a toolholder pocket 110. The toolholder pocket 110 is configured to hold a cutting insert 200 therein. The toolholder body 102 may further include one or more additional toolholder pockets 130, 140, 150, 160, 170, 180 for holding one or more additional cutting inserts 201, 202, 203, 204, 205, 206.

Figure 2:
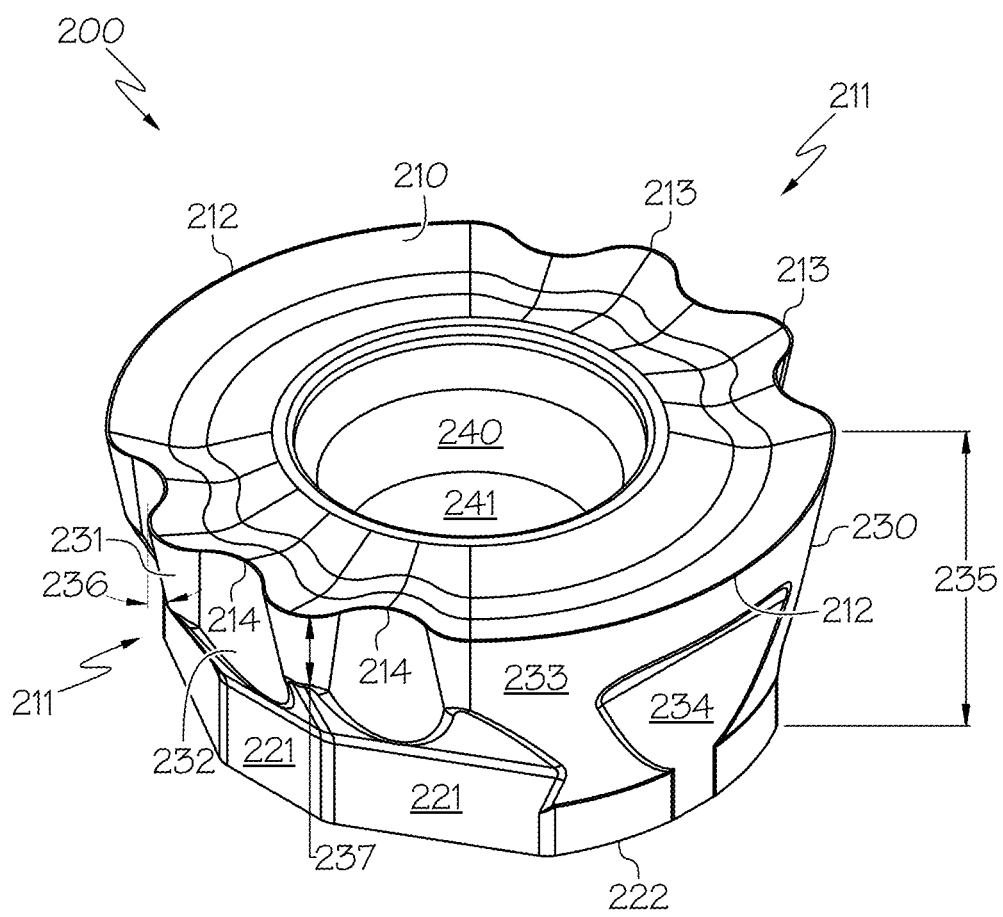
FIG. 2 is a perspective view of a cutting insert of the cutting tool of FIG. 1.
Figure 3:
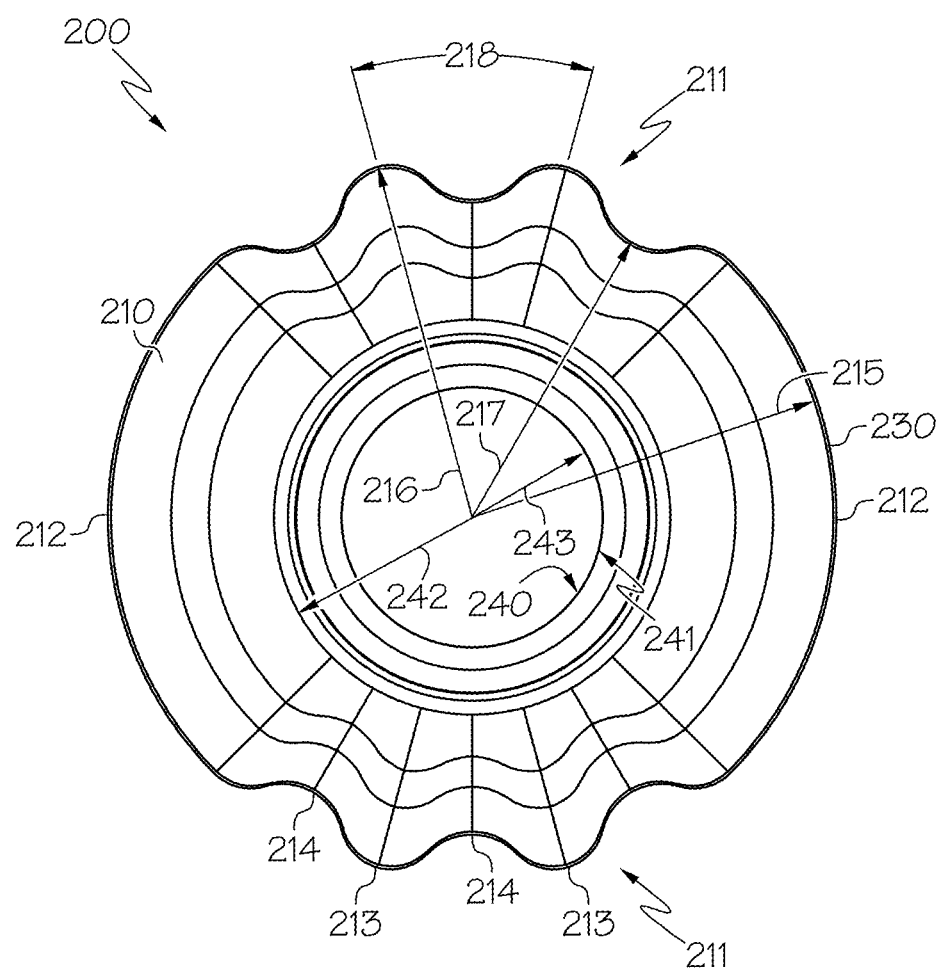
FIG. 3 is a top view of the cutting insert of FIG. 2.
Figure 4:
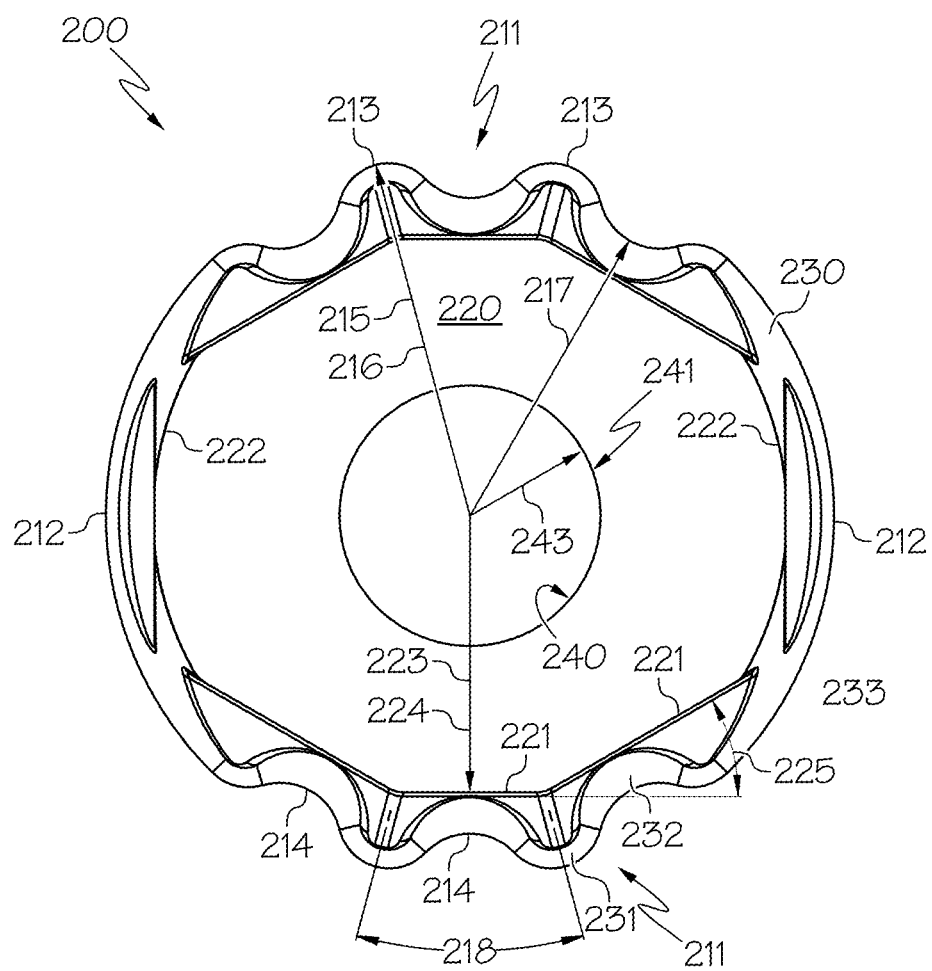
FIG. 4 is a bottom view of the cutting insert of FIG. 2.
Figure 8:
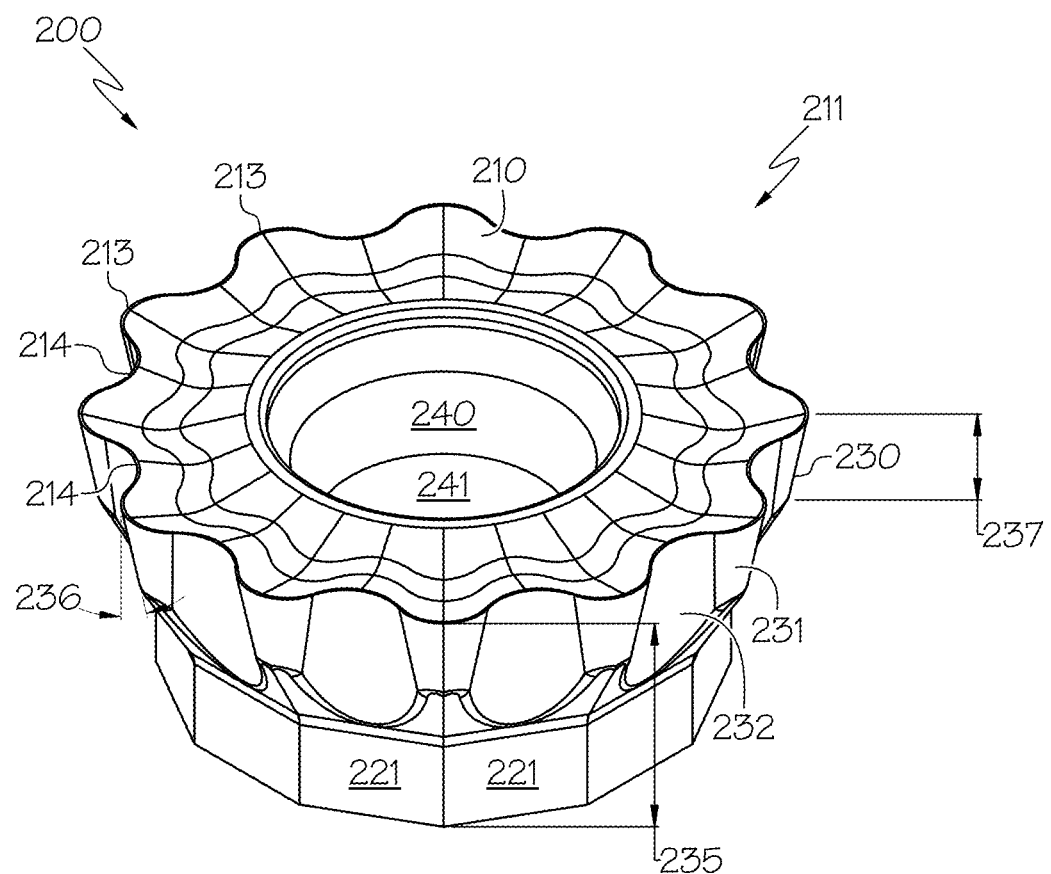
FIG. 8 is a perspective view of a cutting insert of the cutting tool of FIG. 7.
Figure 9:
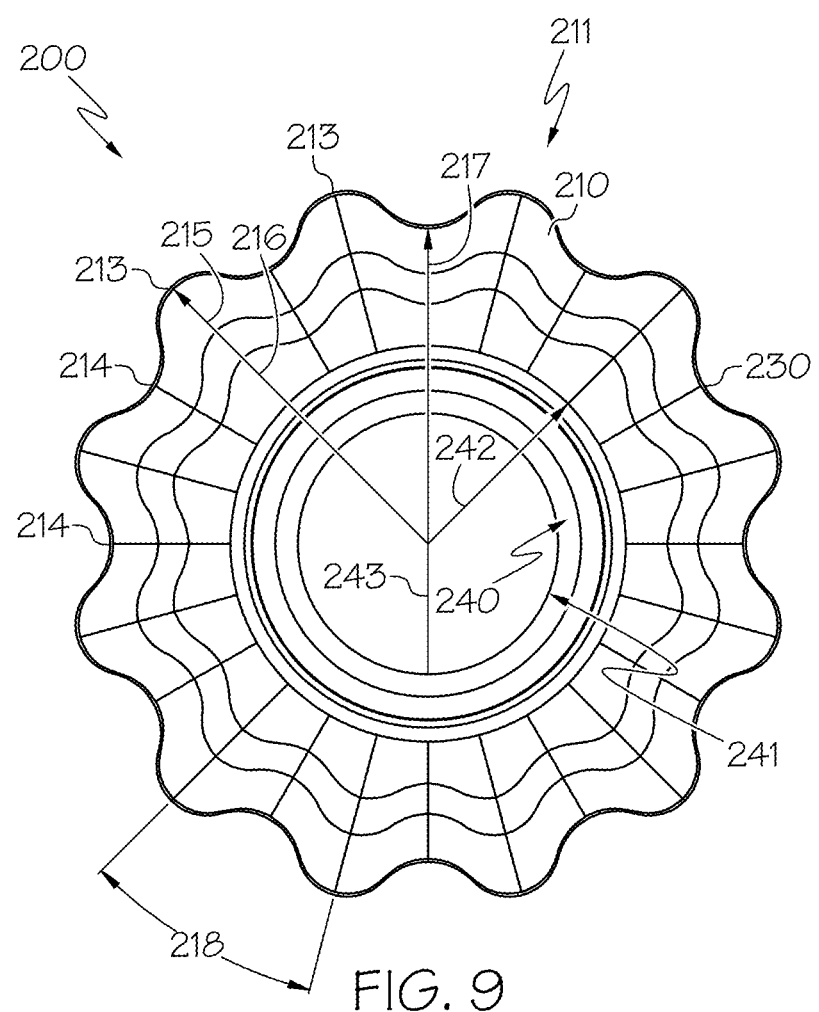
FIG. 9 is a top view of the cutting insert of FIG. 8.
Figure 10:
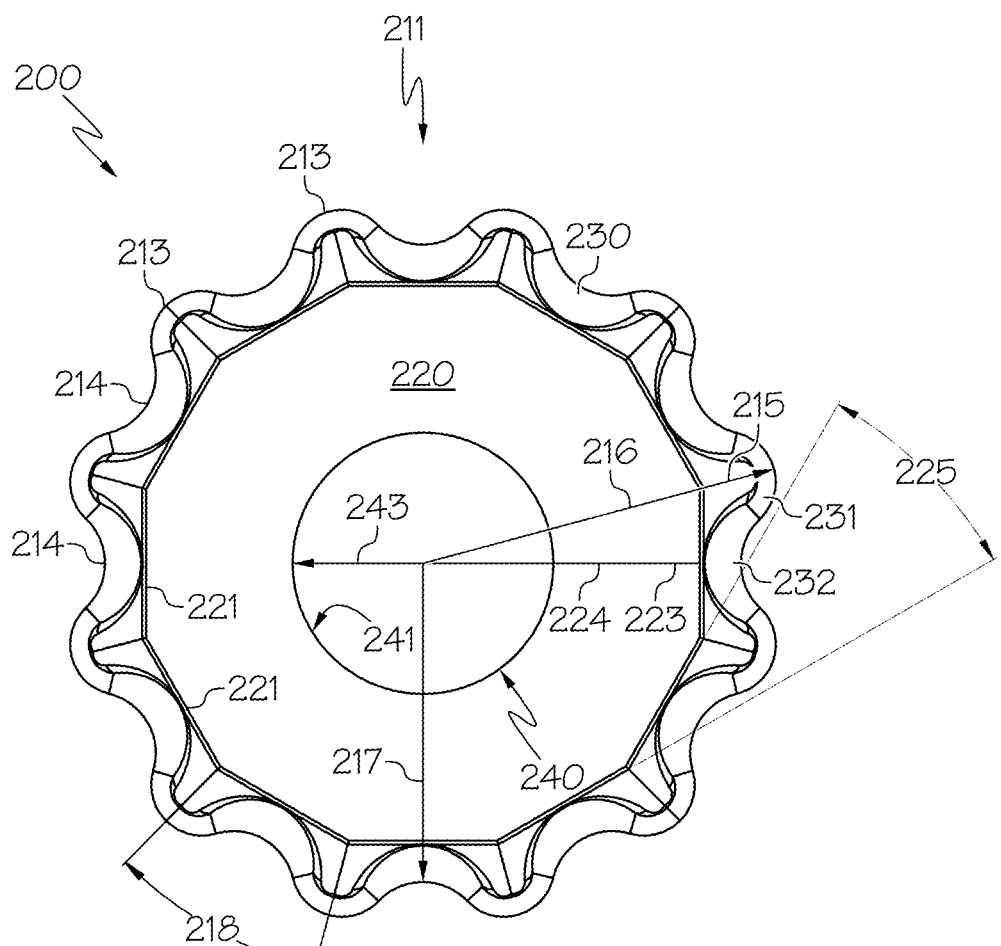
FIG. 10 is a bottom view of the cutting insert of FIG. 8.

FIGS. 2 to 4 show an exemplary cutting insert according to a first embodiment, in which the cutting insert has a plurality of circular sinusoidal cutting inserts extending about a portion of an entire periphery thereof. FIGS. 8 to 10 show an exemplary cutting insert according to a second embodiment, in which the cutting insert has a plurality of circular sinusoidal cutting inserts extending an entire periphery thereof.

The cutting inserts 200 may be formed of any material not inconsistent with the objectives of the present description. Exemplary materials include cemented carbide, carbide, polycrystalline diamond, polycrystalline cubic boron nitride, ceramic, cermet, steel or other alloy. In a specific example, the substrate is formed of cemented carbide. A cemented carbide substrate may include tungsten carbide (WC). WC can be present in any amount not inconsistent with the objectives of the present description. For example, WC can be present in an amount of at least 70 weight percent, in an amount of at least 80 weight percent, or in an amount of at least 85 weight percent. Additionally, a metallic binder of cemented carbide can include cobalt or cobalt alloy. Cobalt, for example, can be present in a cemented carbide substrate in an amount ranging from 1 weight percent to 15 weight percent. In some embodiments, cobalt is present in a cemented carbide substrate in an amount ranging from 5-12 weight percent or from 6-10 weight percent. Further, a cemented carbide substrate may exhibit a zone of binder enrichment beginning at and extending inwardly from the surface of the substrate. Cemented carbide substrates can also include one or more additives such as, for example, one or more of the following elements and/or their compounds: titanium, niobium, vanadium, tantalum, chromium, zirconium and/or hafnium. In some embodiments, titanium, niobium, vanadium, tantalum, chromium, zirconium and/or hafnium form solid solution carbides with WC of the substrate. For example, the substrate can include one or more solid solution carbides in an amount ranging from 0.1-5 weight percent. Additionally, a cemented carbide substrate can include, for example, nitrogen. In an aspect, the cutting insert 200 may be a coated body, including one or more coatings.

As shown in FIGS. 2 to 4 and FIGS. 8 to 10, the cutting inserts 200 include an upper surface 210 having a plurality of circular sinusoidal cutting edges 211, a lower surface 220, and an exterior sidewall 230. The circular sinusoidal cutting edges 211 have the shape of a sinusoidal waveform arranged along a circular path. Thus, the circular sinusoidal cutting edges 211 are distinguished from sinusoidal cutting edges arranged along a straight path.

The cutting inserts 200 preferably further include an interior sidewall 240 defining an aperture 241 to facilitate retention of the cutting insert 200 within the toolholder pocket 110. The aperture 241 may have a maximum radius of 242 at a top of the aperture 241, and the aperture 241 may have a minimum radius of 243 at a bottom of the aperture 243. The minimum radius 243 is less than the maximum radius 242.

The aperture 241 may extend from the upper surface 210 to the lower surface 220. When the cutting insert 200 is mounted onto the toolholder body 102 of the toolholder 100, the lower surface 220 of the cutting insert 200 corresponds with the pocket floor 112 of the toolholder 100, and the exterior sidewall 230 corresponds with the pocket wall 116 of the toolholder 100. A fastener (e.g. screw) may be inserted through the aperture 241 and bore 114 to secure the cutting insert 200 to the toolholder 100 within the toolholder pocket 110.

As shown in FIGS. 2 to 4 and FIGS. 8 to 10, the circular sinusoidal cutting edges 211 includes one or more crests 213 and one or more troughs 214. As shown in FIGS. 2 to 4, the one or more crests 213 and one or more troughs 214 may extend about only a portion of the entire periphery of the upper surface 210. In this case, a periphery of the upper surface 210 may further include one or more circular edges 212. Alternately, as shown in FIGS. 8 to 10, the crests 213 and troughs 214 may extend about the entire periphery of the upper surface 210.

The upper surface 210 may define a maximum radius 215 with respect to an axis of the cutting insert 200. In an aspect, the one or more circular edges 212, if present, may be positioned to have a radius of curvature equal of the maximum radius 215 of the upper surface 210.

The crests 213 are positioned at a crest radial distance 216 with respect to an axis of the cutting insert 200. In an aspect, the crest radial distance 216 is the same as the maximum radius 215 of the upper surface 210. The radius of curvature of the crest 213 is less than the maximum radius 215 of the upper surface 210. In an aspect, the radius of curvature of the crest 213 is less than 50% of the maximum radius 215 of the upper surface 210. In another aspect, the radius of curvature of the crest 213 is more than 5% of the maximum radius 215 of the upper surface 210.

The troughs 214 are positioned at a trough radial distance 217 with respect to an axis of the cutting insert 200. The trough radial distance 217 is the less than crest radial distance 216. The radius of curvature of the trough 214 is less than the maximum radius 215 of the upper surface 210.

Preferably the radius of curvature of the trough 214 is substantially the same as the radius of curvature of the crest 213.

The circular sinusoidal cutting edges 211 have an amplitude defined by a difference between the crest radial distance 216 and the trough radial distance 217. In an aspect, the amplitude is less than 20% of the maximum radius 215 of the upper surface 210. In another aspect, the amplitude is more than 2% of the maximum radius 215 of the upper surface 210.

Referring to FIGS. 2 to 4, the upper surface 210 may include multiple circular sinusoidal cutting edges 211 which do not form part the same sinusoidal waveform. Alternatively, as shown in FIGS. 8 to 10, the plurality of circular sinusoidal cutting edges 211 may extend about the entire periphery of the upper surface 210.

In an aspect, the circular sinusoidal cutting edges 211 may include two more crests 213 within the same sinusoidal waveform, as shown in both FIGS. 2 to 4 and in FIGS. 8 to 10. In the case of two more crests 213 within the same sinusoidal waveform, adjacent crests 213 are offset by an offset angle 218. The offset angle may be, for example, in a range of 10 to 90 degrees, preferably in a range of 15 to 45 degrees, more preferably in a range of 20 to 30 degrees. In a specific example, the offset angle is about 25 degrees.

The lower surface 220 may include a plurality of polygonal edges 221 corresponding to the plurality of circular sinusoidal cutting edges 211. As shown in FIGS. 2 to 4, the plurality of polygonal edges 221 may extend about only a portion of the entire periphery of the upper surface 210. In this case, a periphery of the lower surface 220 may further include, for example, one or more circular edges 222. Alternatively, as described below in FIGS. 8 to 10, the plurality of polygonal edges 221 may extend about the entire periphery of the upper surface 210.

In an aspect, each polygonal edge 221 may each correspond to a crest 213 within the same sinusoidal waveform. In this case, adjacent polygonal edges 221 may be offset by an offset angle 225. The offset angle 225 may be, for example, in a range of 10 to 90 degrees, preferably in a range of 15 to 45 degrees, more preferably in a range of 20 to 30 degrees. In a specific example, the offset angle 225 is the same as the offset angle 218 between adjacent crests 213.

The lower surface 220 may define a maximum radius 223 with respect to an axis of the cutting insert 200. In an aspect, the one or more circular edges 222, if present, are positioned to have a radius of curvature equal of the maximum radius 223 of the lower surface 220. In an aspect, the maximum radius 223 of the lower surface 220 may be less than the maximum radius 215 of the upper surface 210.

The polygonal edges 221 may be positioned at a polygonal edge distance 224 with respect to an axis of the cutting insert 200. In a specific example, the polygonal edge distance 224 is substantially the same as the trough radial distance 217. In an aspect, the one or more circular edges 222, if present, may be positioned to have a maximum radius greater than the polygonal edge distance 224.

The exterior sidewall 230 preferably provides a positive cutting clearance 236 under the plurality of circular sinusoidal cutting edges 211 preferably by way of including a plurality of convex flank surfaces 231 below the plurality of circular sinusoidal cutting edges 211. In an aspect, the exterior sidewall 230 further includes concave surfaces 232 between the plurality of convex flank surfaces 231. As shown in FIGS. 2 to 4, the plurality of convex flank surfaces 231 may extend about only a portion of the entire periphery of the exterior sidewall 230. In this case, a periphery of the exterior sidewall 230 may further include, for example, one or more circular surfaces 233. Alternatively, as shown in FIGS. 8 to 10, the plurality of convex flank surfaces 231 may extend about the entire periphery of the exterior sidewall 230.

The exterior sidewall 230 has a height 235, which may be any height not inconsistent with the objectives of the present description. The convex flank surfaces 231 have a height 237. In an aspect, the height 237 of the convex flank surfaces 231 is less than the height 235 of the exterior sidewall 230. In an example, the height 237 of the convex flank surfaces 231 may be less than 90% of the height 235 of the exterior sidewall 230. In another example, the height 237 of the convex flank surfaces 231 may be less than 80% of the height 235 of the exterior sidewall 230. In yet another example, the height 237 of the convex flank surfaces 231 may be less than 60% of the height 235 of the exterior sidewall 230. The convex flank surfaces 231 preferably provide a cutting clearance of at least 1%, more preferably at least 2%, even more preferably at least 3%.

As shown in FIGS. 2 to 4, the exterior sidewall 230 may further include a sitting surface 234. In an aspect the sitting surface 234 is preferably a vertical sitting surface.

Returning to FIGS. 1 and 7, the toolholder body 102 includes toolholder pocket 110. The toolholder pocket 110 may include a pocket floor 112 having a bore 114 therein. The toolholder pocket 110 further includes a pocket wall 116, which may include a first pocket sidewall 118 and a second pocket sidewall 120 transverse to the first pocket sidewall 118. Preferably the first pocket sidewall 118 and a second pocket sidewall 120 are substantially perpendicular to each other. More preferably, the first pocket sidewall 118 and a second pocket sidewall 120 are positioned 90 degrees apart.

In both FIGS. 1 and 7, the first pocket sidewall 118 includes a first anti-rotation engagement surface 122. The first anti-rotation engagement surface 122 may include any surface that can engage with a convex flank surface 231 of the exterior sidewall 230 of the cutting insert 200 to resist rotation of cutting insert 200. In an aspect, the first anti-rotation engagement surface 122 is in the form of a first concave recess in the first pocket sidewall 118 corresponding to the shape of the convex flank surface 231 to provide clearance for inserting the convex flank surface 231 into the first concave recess 231 when the cutting insert 200 is positioned in the toolholder pocket 210.

As shown in FIGS. 1 and 7, the first pocket sidewall 118 may further include a second concave recess 124 in the first pocket sidewall 118 corresponding to the shape of the convex flank surface 231 to provide clearance for inserting another convex flank surface 231 into the second concave recess 231 when the cutting insert 200 is positioned in the toolholder pocket 210.

The second pocket sidewall 120 may include a second anti-rotation engagement surface 126. The second anti-rotation engagement surface 126 may include any surface that can engage with the sitting surface 234 of the exterior sidewall 230 of the cutting insert 200 to resist rotation of cutting insert 200. As shown in FIG. 1, the second anti-rotation engagement surface 126 may be a vertical surface of the second pocket sidewall 120 corresponding to a vertical sitting surface 234 of the cutting insert 200 of FIGS. 2 to 4. Alternatively, as shown in FIG. 7, the second anti-rotation engagement surface 126 may be in the form of a first concave recess in the second pocket sidewall 120 corresponding to the shape of a convex flank surface 231 to provide clearance for inserting the convex flank surface 231 into the first concave recess 231 when the cutting insert 200 is positioned in the toolholder pocket 210.

As shown in FIG. 1, the second pocket sidewall 120 may include an upper clearance 127 above the second anti-rotation engagement surface 126 to provide clearance for the one or more circular edges 212 when the cutting insert 200 is positioned in the toolholder pocket 210.

As shown in FIG. 7, the second pocket sidewall 120 may include a third anti-rotation engagement surface 128. The third anti-rotation engagement surface 128 may be in the form of a second concave recess in the second pocket sidewall 120 corresponding to the shape of a convex flank surface 231 to provide clearance for inserting the convex flank surface 231 into the second concave recess 128 when the cutting insert 200 is positioned in the toolholder pocket 210.

Figure 6:
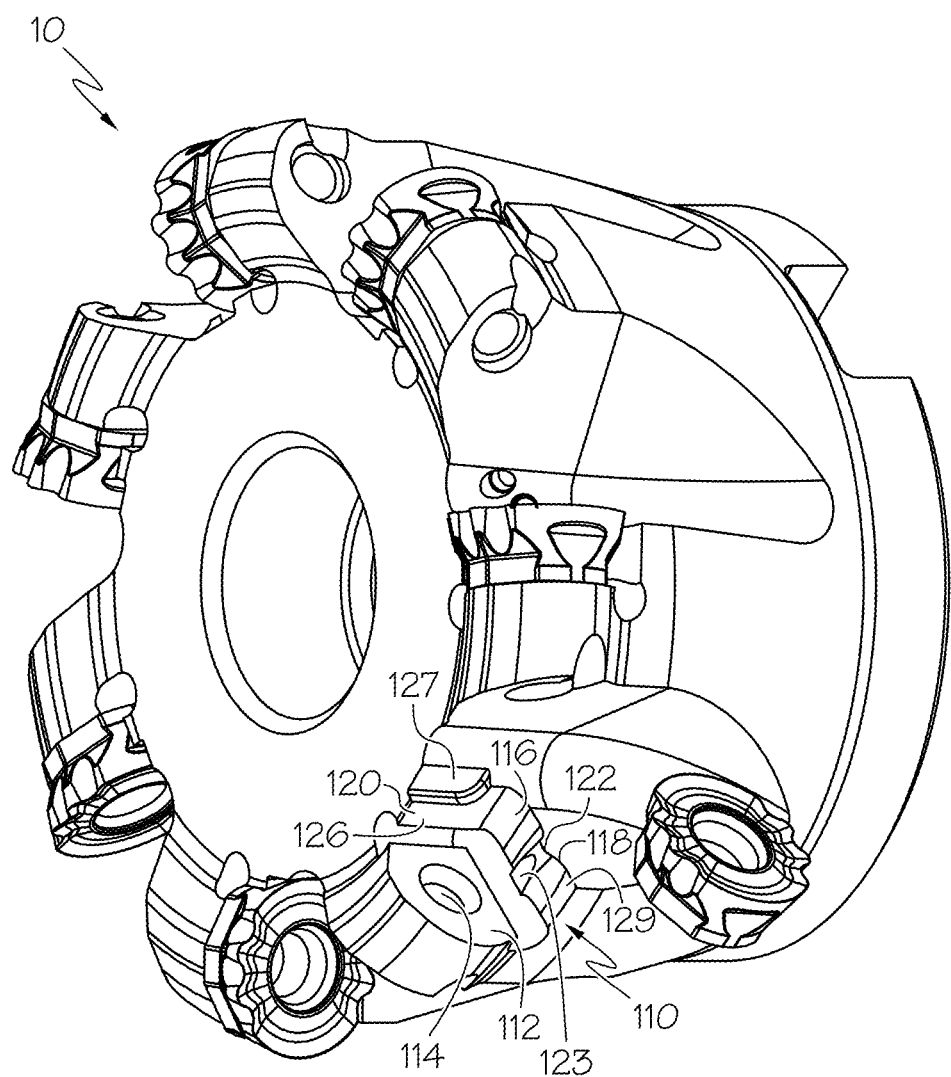
FIG. 6 is a perspective view of a variation of the cutting tool according to the first embodiment of the present description.
Figure 12:
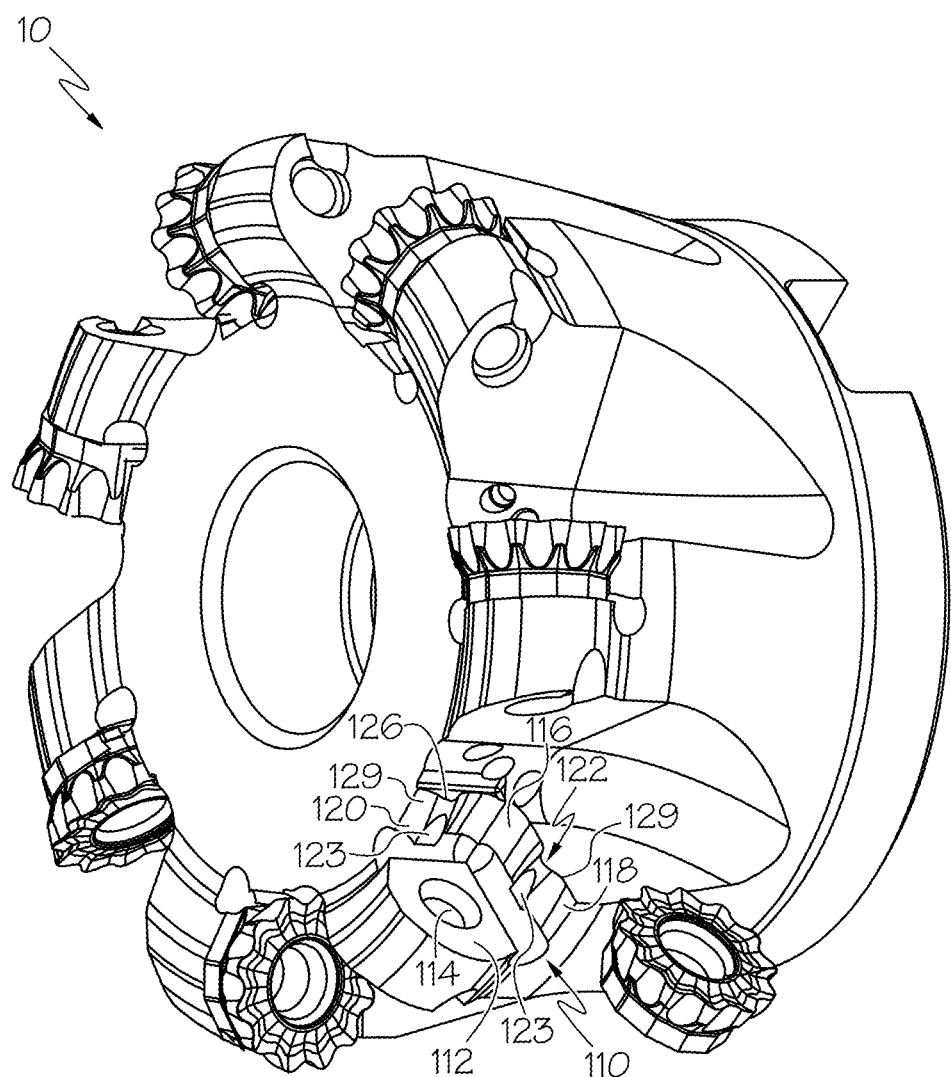
FIG. 12 is a perspective view of a variation of the cutting tool according to the second embodiment of the present description.

FIGS. 6 and 12 illustrate a variations of the cutting tools of FIGS. 1 and 7, respectively. As shown in FIG. 6, the second anti-rotation engagement surface 126 may be a vertical surface of the second pocket sidewall 120 corresponding to a vertical sitting surface 234 of the cutting insert 200 of FIGS. 2 to 4. As shown in FIG. 12, the first anti-rotation engagement surface 122 may take the form of a convex anti-rotation engagement surface and the second anti-rotation engagement surface 126 may take the form of a convex anti-rotation engagement surface. The cutting insert 200 should have a complemental geometry to the convex anti-rotation engagement surface, e.g. a sinusoidal-based complementary geometry.

It should be understood that another variation of the cutting tool of FIG. 7 may include a first anti-rotation engagement surface 122 in the form of the convex anti-rotation engagement surface and a second anti-rotation engagement surface 126 in the form of the concave anti-rotation engagement surface as described with reference to FIG. 7.

In further reference to FIGS. 6 and 12, the convex anti-rotation engagement surface of the first anti-rotation engagement surface 122 and/or the second anti-rotation engagement surface 126 may include a flat surface 123 for the purpose for reducing a machining time on the convex feature. In an industrial term, the combined convex anti-rotation engagement surfaces (122 in FIG. 6, or 122 and 126 in FIG. 12) and the flat surface 123 (shown in FIG. 6 as a representative) may be called as a truncated convex anti-rotation engagement surface. Additionally, the convex anti-rotation engagement surface may include a blend radii 129 for ease of pocket manufacturing.

Figure 5:
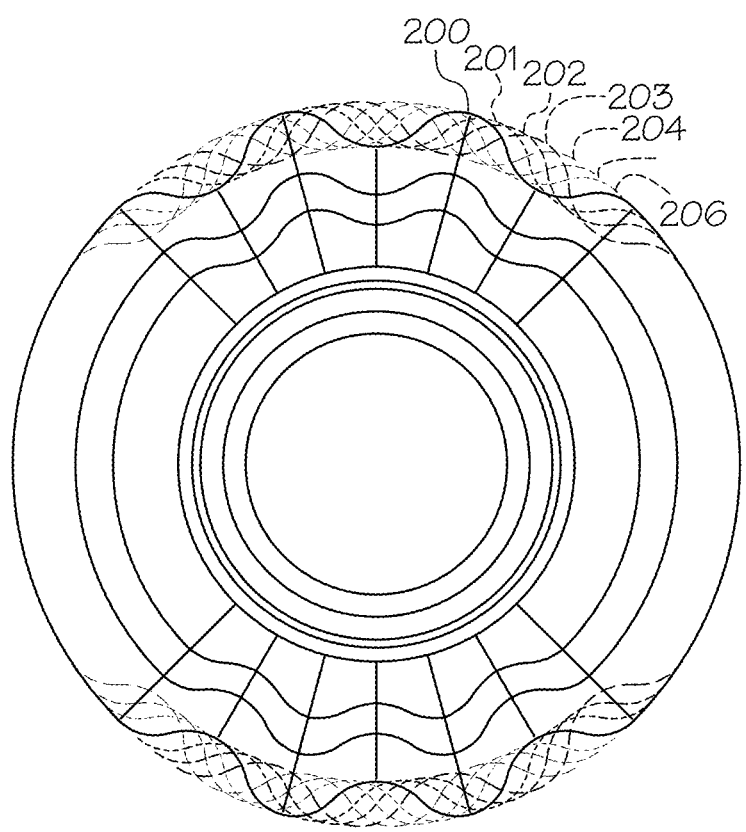
FIG. 5 is a schematic view illustrating the effect of angularly offsetting multiple cutting inserts according to the first embodiment of the present description.

FIG. 5 illustrates the effect of angularly offsetting multiple cutting inserts 200, 201, 202, 203, 204, 205, 206 according to the first embodiment of the present description. In this case, the respective toolholder pockets 210 for securing each cutting insert are angularly offset with respect to each other such the cutting inserts 200, 201, 202, 203, 204, 205, 206 held in the respective toolholder pockets 210 are angularly offset from each other. FIG. 5 illustrates a superimposition of the cutting inserts 200, 201, 202, 203, 204, 205, 206 into the same plane. The angular offset may be, for example, in a range of about 1 to about 20 degrees. In another example, the angular offset may be in a range of about 2 to about 10 degrees. In yet another example, the angular offset may be in a range of about 3 to about 5 degrees. In a specific example, the angular offset may be about 4 degrees. As shown in FIG. 5, when the multiple cutting inserts 200, 201, 202, 203, 204, 205, 206 are superimposed at offset angles, they have a combined effect creating a substantially straight cut during a milling process.

Figure 11:
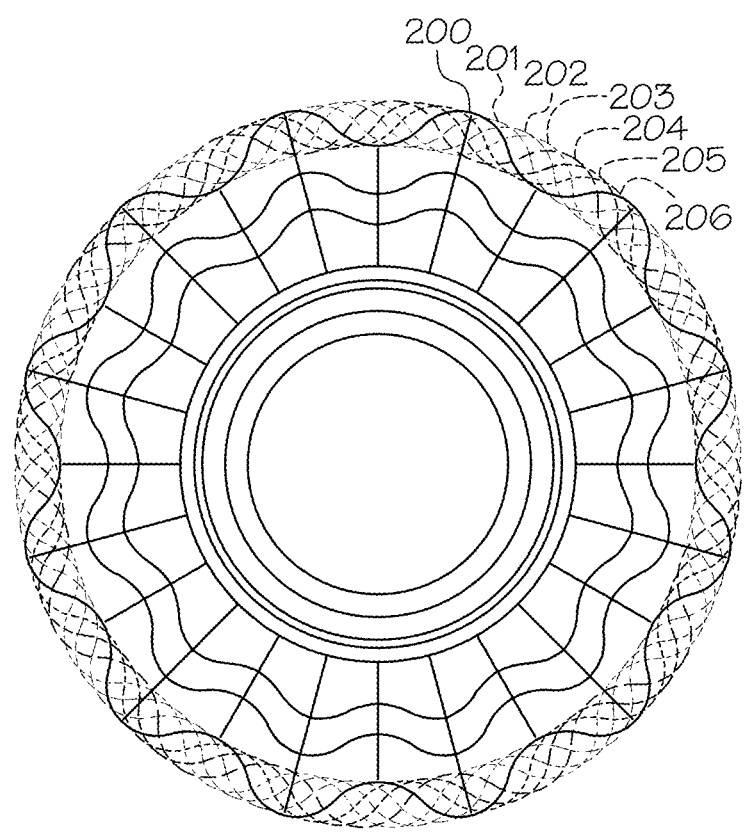
FIG. 11 is a schematic view illustrating the effect of angularly offsetting multiple cutting inserts according to the second embodiment of the present description.

FIG. 11 illustrates the effect of angularly offsetting multiple cutting inserts 200, 201, 202, 203, 204, 205, 206 according to the second embodiment of the present description. In this case, the respective toolholder pockets 210 for securing each cutting insert are angularly offset with respect to each other such the cutting inserts 200, 201, 202, 203, 204, 205, 206 held in the respective toolholder pockets 210 are angularly offset from each other. FIG. 10 illustrates a superimposition of the cutting inserts 200, 201, 202, 203, 204, 205, 206 into the same plane. The angular offset may be, for example, in a range of about 1 to about 20 degrees. In another example, the angular offset may be in a range of about 2 to about 10 degrees. In yet another example, the angular offset may be in a range of about 3 to about 5 degrees. In a specific example, the angular offset may be about 4 degrees. As shown in FIG. 10, when the multiple cutting inserts 200, 201, 202, 203, 204, 205, 206 are superimposed at offset angles, they have a combined effect creating a substantially straight cut during a milling process.

An exemplary method of cutting includes steps of mounting a cutting insert on a toolholder, the cutting insert having a circular sinusoidal cutting edge and a convex flank surface beneath the circular sinusoidal cutting edge and positioning an anti-rotation engagement surface in contact with the convex flank surface of the cutting insert to resist rotation of cutting insert. The method may include any combination of the features of the toolholder 100 and cutting insert 200 as described above.

Although various embodiments of the disclosed coating and coated cutting insert have been shown and described, modifications may occur to those skilled in the art upon reading the specification. The present application includes such modifications and is limited only by the scope of the claims.

What is claimed is:

1. A cutting insert comprising:
   an upper surface, the upper surface having one or more circular sinusoidal cutting edges and one or more circular cutting edges;
   a lower surface opposite the upper surface, the lower surface having one or more polygonal edges; and
   an exterior sidewall between the upper surface and the lower surface.

2. The cutting insert of claim 1, wherein the exterior sidewall provides a positive cutting clearance under the one or more circular sinusoidal cutting edges.

3. The cutting insert of claim 1, wherein the exterior sidewall has a plurality of convex flank surfaces between the one or more circular sinusoidal cutting edges and the one or more polygonal edges.

4. A cutting tool comprising
   a toolholder including a toolholder pocket having a pocket wall, the pocket wall comprising a first anti-rotation engagement surface and a second anti-rotation engagement surface; and
   a cutting insert mounted in the toolholder pocket, the cutting insert comprising:
      an upper surface, the upper surface having one or more circular sinusoidal cutting edges and one or more circular cutting edges;
      a lower surface opposite the upper surface; and
      an exterior sidewall between the upper surface and the lower surface,
   wherein the first anti-rotation engagement surface and the second anti-rotation engagement surface of the pocket wall of the toolholder engage the exterior sidewall of the cutting insert to resist rotation of cutting insert.

5. The cutting tool of claim 4, wherein the lower surface of the cutting insert has one or more polygonal edges corresponding to the one or more circular sinusoidal cutting edges.

6. The cutting tool of claim 4, wherein the exterior sidewall has one or more convex flank surfaces under the one or more circular sinusoidal cutting edges.

7. The cutting tool of claim 4, wherein the exterior sidewall provides a positive cutting clearance under the one or more circular sinusoidal cutting edges.

8. The cutting tool of claim 4, wherein the first anti-rotation engagement surface is in the form of a truncated convex anti-rotation engagement surface.

9. The cutting tool of claim 4, wherein the first anti-rotation engagement surface is in the form of a concave anti-rotation engagement surface.

10. The cutting tool of claim 4, wherein the second anti-rotation engagement surface is in the form of a vertical flat surface.

11. The cutting tool of claim 4, wherein the second anti-rotation engagement surface is in the form of a truncated convex anti-rotation engagement surface.

12. The cutting tool of claim 4, wherein the second anti-rotation engagement surface is in the form of a concave anti-rotation engagement surface.

13. A method of cutting, the method comprising:
mounting a cutting insert on a toolholder, the cutting insert having one or more circular sinusoidal cutting edges, one or more circular cutting edges, and an exterior sidewall beneath the circular sinusoidal cutting edge; and
positioning an anti-rotation engagement surface in contact with a sitting surface of the exterior sidewall of the cutting insert to resist rotation of cutting insert.

14. A cutting insert comprising:
an upper surface having a periphery;
a lower surface opposite the upper surface; and
an exterior sidewall between the upper surface and the lower surface,
wherein the upper surface has a plurality of circular sinusoidal cutting edges extending about an entire periphery of the upper surface, each of the plurality of circular sinusoidal cutting edges formed by a sinusoidal waveform comprising a crest and a trough extending from a central aperture to the periphery of the upper surface, and
wherein the lower surface has a plurality of polygonal edges.

15. The cutting insert of claim 14, wherein the exterior sidewall has a plurality of convex flank surfaces between each crest of the plurality of circular sinusoidal cutting edges and the plurality of polygonal edges and a plurality of concave flank surface extending between each trough of the plurality of convex flank surfaces.

16. The cutting insert of claim 15, wherein the plurality of convex flank surfaces have a height less than a height of the exterior sidewall.

17. The cutting insert of claim 15, wherein the exterior sidewall has a sitting surface for cooperating with an anti-rotation engagement surface on a pocket sidewall of a toolholder to resist rotation of the cutting insert when mounted in a pocket of the toolholder.

* * * * *